United States Patent
Choi et al.

(10) Patent No.: US 10,498,178 B2
(45) Date of Patent: Dec. 3, 2019

(54) RECEIVER FOR SIMULTANEOUSLY TRANSFERRING ENERGY AND DATA AND SIGNAL PROCESSING METHOD THEREOF

(71) Applicant: KOREA ADVANCED INSTITUTE OF SCIENCE AND TECHNOLOGY, Daejeon (KR)

(72) Inventors: Wan Choi, Daejeon (KR); Dae Kyu Shin, Daejeon (KR); Jinho Kang, Daejeon (KR); Young Bin Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 362 days.

(21) Appl. No.: 15/426,807

(22) Filed: Feb. 7, 2017

(65) Prior Publication Data
US 2017/0288473 A1 Oct. 5, 2017

(30) Foreign Application Priority Data

Mar. 30, 2016 (KR) ........................ 10-2016-0038617

(51) Int. Cl.
| | |
|---|---|
| H02J 7/00 | (2006.01) |
| H02J 50/80 | (2016.01) |
| H04L 27/34 | (2006.01) |
| H04L 27/38 | (2006.01) |
| H04B 5/00 | (2006.01) |
| H02J 7/02 | (2016.01) |
| H02J 7/04 | (2006.01) |
| H04L 27/00 | (2006.01) |
| H02J 50/00 | (2016.01) |

(52) U.S. Cl.
CPC .............. *H02J 50/80* (2016.02); *H02J 7/025* (2013.01); *H02J 7/042* (2013.01); *H02J 50/00* (2016.02); *H04B 5/0037* (2013.01); *H04L 27/0008* (2013.01); *H04L 27/3405* (2013.01); *H04L 27/389* (2013.01)

(58) Field of Classification Search
USPC .................................................. 320/106–115
See application file for complete search history.

(56) References Cited

U.S. PATENT DOCUMENTS

| | | | |
|---|---|---|---|
| 2013/0043735 A1* | 2/2013 | Low ..................... | H04B 5/0012 307/104 |
| 2013/0225077 A1* | 8/2013 | Schultz ................... | H02J 7/025 455/41.1 |
| 2015/0137746 A1* | 5/2015 | Lee ......................... | H02J 7/025 320/108 |

FOREIGN PATENT DOCUMENTS

KR 10-2010-0101470 A 9/2010

OTHER PUBLICATIONS

Zhou et al., "Wireless Information and Power Transfer: Architecture Design and Rate-Energy Tradeoff," *IEEE Transactions on Communications* 61(11):4754-4767, Nov. 2013.

* cited by examiner

*Primary Examiner* — Binh C Tat
(74) *Attorney, Agent, or Firm* — Seed IP Law Group LLP

(57) ABSTRACT

A receiver for transferring energy and data together and a signal processing method in the receiver are provided. The method includes decoding data included in a received signal using part of power received for charging a charging unit of the receiver with energy with respect to the signal for energy charging and data decoding, the signal being received from a transmitter.

10 Claims, 14 Drawing Sheets

RECEIVER FOR SIMULTANEOUSLY TRANSFERRING ENERGY AND DATA AND SIGNAL PROCESSING METHOD THEREOF

CROSS-REFERENCE TO RELATED APPLICATIONS

A claim for priority under 35 U.S.C. § 119 is made to Korean Patent Application No. 10-2016-0038617 filed Mar. 30, 2016, in the Korean Intellectual Property Office, the entire contents of which are hereby incorporated by reference.

BACKGROUND

Embodiments of the inventive concepts described herein relate to a receiver for performing signal processing for energy charging and data decoding in a wireless communication environment for simultaneously supporting wireless energy charging and data transfer and a signal processing method thereof, and more particularly, relate to technologies for simultaneously supporting signal processing for energy charging of signals received at a receiver and signal processing for data decoding if performing wireless energy charging and data transfer using radio frequency (RF) signals.

In a next generation mobile communication system, a transmitter uses RF signals as a medium for directly transferring energy as well as transferring data. A receiver supports wireless energy transfer technologies of supporting energy harvesting of receiving energy transferred over wireless channels and recharging a battery of a limited capacity. The wireless energy transfer technologies address a problem where a supplied power is limited and where the cost of replacing a battery is high, facilitate a continuous operation of the receiver, and support green communication through efficient energy recycling of radio wave resources thoughtlessly wasted.

However, a general signal processing method for receiving data transferred from the transmitter at the receiver and for data decoding at the receiver is unsuitable for wireless energy transfer. In other words, if signal processing is performed with respect to a signal for simultaneously performing wireless energy charging and data transfer using a signal processing method used for data decoding, there is low energy transfer efficiency. Similarly, since it is impossible to transfer data using a phase of an RF signal in a signal processing method of the receiver for maximum wireless energy transfer, it is difficult to decode a large amount of data.

For example, if the whole signal transmitted from the transmitter is used for energy charging and if Bluetooth communication is used as communication for data transfer, there is a need for setting an optimal parameter for charging. If a receiver is charged using magnetic charging, it has a very limited charging distance within dozens of centimeters or one meter and has a low data rate. In this case, a charging distance may be broadened using an RF, but charging efficiency is more reduced in the RF as a distance between a transmitter and a receiver is distant.

Thus, there is a need for signal processing technologies of simultaneously considering signal processing of a receiver for wireless energy transfer and signal processing of the receiver for data transfer upon RF-based wireless energy charging.

FIG. 1 is a block diagram illustrating a configuration of a receiver for simultaneously performing energy recharging and data decoding using time division.

Referring to FIG. 1, a transmitter (not shown) such as a base station (BS) may transmit a transmit signal for energy recharging and data decoding to a receiver 100. The receiver 100 may receive the signal transmitted from the transmitter. In this case, the receiver 100 may divide a time into a time $\rho$ for energy recharging and a time $1-\rho$ for data decoding.

A signal received during the time $\rho$ from the transmitter, that is, an RF signal may be rectified by passing through a rectifier 120. As such, as the signal passes through the rectifier 120, energy may be harvested. An energy recharging unit 130 may recharge a battery of the receiver 100 which is user equipment (UE) using the harvested energy.

The data decoding unit 110 may decode data based on a signal received during the time $1-\rho$ from the transmitter.

The time division method described with reference to FIG. 1 may perform only signal processing for energy recharging without performing data decoding during the time $\rho$. The time division method may perform only signal processing for data decoding without performing signal processing for energy recharging during the time $1-\rho$.

FIG. 2 is a block diagram illustrating a configuration of a receiver for simultaneously performing energy recharging and data decoding using power split.

Referring to FIG. 2, a transmitter (not shown) such as a BS may transmit a transmit signal for energy recharging and data decoding to a receiver 200. The receiver 200 may receive the signal transmitted from the transmitter. In this case, the receiver 200 may divide a signal received from the transmitter, that is, an RF signal into a signal having energy of a constant rate $\rho$ and a signal having energy of the remaining rate $1-\rho$.

A rectifier 220 may harvest energy by passing only the signal of the rate $\rho$ in the RF signal. An energy recharging unit 230 may recharge a battery (not shown) of the receiver 200 using the harvested energy.

A data decoder 210 may perform data decoding using only the signal of the rate $1-\rho$. In other words, the power split method may split a power of the received signal into the rate $\rho$ and the rate $1-\rho$, may use the signal having the energy as much as the rate $\rho$ for only signal processing for energy recharging, and may use the signal having the energy as much as the rate $1-\rho$ for only signal processing for data decoding.

The time division method and the power split method described with reference to FIGS. 1 and 2 may support simultaneous energy and data transfer through an operation of dividing an RF signal received from the transmitter into two parts and using the divided two parts to suit different purposes (e.g., energy recharging and data decoding). In this case, as the signal is divided into two parts and the two parts are processed based on purposes, only part of a received signal rather than the whole received signal may be used for energy recharging, and only the remaining signal may be used for data decoding. Thus, data decoding efficiency may be reduced in view of energy recharging, and energy recharging efficiency may be decreased in view of data decoding. In other words, the receiver may have low transfer efficiency.

FIG. 3 is a block diagram illustrating a configuration of a receiver for performing energy recharging and data decoding using the whole RF signal received from a transmitter.

Referring to FIG. 3, a transmitter (not shown) such as a BS may transmit a transmit signal for energy recharging and data decoding to a receiver 300.

A rectifier 310 may first rectify the whole RF signal which is a signal received from the transmitter for energy recharging. Part of a signal passing through the rectifier 310 may be transmitted as an input of an energy recharging unit 330 for energy recharging, and the remaining signal except for the part in the signal passing through the rectifier 310 may be transmitted as an input of a data decoder 320 for data decoding.

For example, the data decoder 320 may receive a signal as much as a rate 1−ρ in the signal passing through the rectifier 310 and may decode data. As such, the receiver 300 may convert the signal received from the transmitter into a baseband signal by passing the whole received signal through the rectifier 310 and performing data decoding with respect to the signal passing through the rectifier 310. The receiver 300 may perform analog-to-digital conversion (ADC) of the baseband signal, thus saving consumed energy.

In this case, while the received signal passes through the rectifier 310, phase information of original data included in the received signal may be changed or lost. In other words, as the whole received signal passes through the rectifier 310, a phase of the whole received signal may be lost. As a result, decoding efficiency of a large amount of data may be reduced due to the phase loss.

Thus, there is a need for technologies of supporting an amount of charged energy user equipment (UE) (e.g., a smartphone, a tablet personal computer (PC), or the like) which a receiver wants through an operation of rectifying a received signal and supplementing a phase information loss of data due to passing through a rectifier.

Korean Patent Laid-open Publication No. 10-2009-0019974 relates to a wireless charging system and a control method thereof and describes technologies of transmitting a charging signal based on battery state information, receiving a charging signal, and charging a battery. In other words, Korean Patent Laid-open Publication No. 10-2009-0019974 describes technologies of automatically performing a charging function based on the remaining capacity of a battery of a portable device having a wireless charging function and a data communication function.

SUMMARY

Embodiments of the inventive concepts provide technologies for simultaneously considering and performing signal processing for wireless energy recharging and signal processing for data decoding at a receiver.

Embodiments of the inventive concepts provide technologies for increasing an amount of transferred energy and a data rate while reducing a phase information loss of data by using part of a signal used for signal processing for wireless energy recharging for performing signal processing for data decoding.

According to an aspect of an embodiment, a signal processing method in a receiver for transferring energy and data together may include decoding data included in a received signal using part of power received for charging a charging unit of the receiver with energy with respect to the signal for energy charging and data decoding, the signal being received from a transmitter.

The decoding of the data may be performed based on amplitude information of a signal indicating an amount of energy recharged at the charging unit in the received signal and phase information of the signal for the data decoding.

The method may further include performing signal processing for energy charging with respect to a signal corresponding to a first signal processing rate in the signal received from the transmitter and performing signal processing for data decoding with respect to the remaining signal except for the signal corresponding to the first signal processing rate in the received signal and a signal corresponding to a second signal processing rate in a signal where the signal processing for the energy charging is performed.

The performing of the signal processing for the energy charging may include rectifying the signal corresponding to the first signal processing rate in the received signal and using the remaining signal except for the signal corresponding to the second signal processing rate in the rectified signal for energy recharging.

The performing of the signal processing for the data decoding may include down-converting the remaining signal except for the signal corresponding to the first signal processing rate in the received signal into a baseband signal, converting the down-converted baseband signal into a digital signal, and decoding the data using the converted digital signal and the signal corresponding to the second signal processing rate.

Each of the first signal processing rate and the second signal processing rate may be determined based on an amount of recharged energy for charging the charging unit with energy using the received signal.

The decoding of the data may be performed based on amplitude information of a signal corresponding to a second signal processing rate and amplitude information and phase information of the remaining signal except for a signal corresponding to a first signal processing rate.

The method may further include sharing information, comprising a first signal processing rate indicating a power rate to be used for energy charging of the charging unit and a second signal processing rate indicating a power rate to be used for the data decoding in the power rate for the energy charging, with the transmitter.

The decoding of the data may be performed by performing differential detection for the remaining signal except for a signal corresponding to a first signal processing rate in the received signal.

The signal received from the transmitter may indicate a signal modulated based on a power rate to be used for energy charging of the charging unit.

According to another aspect of an embodiment, a receiver for transferring energy and data together may include a transceiver configured to receive a signal for energy charging and data decoding from a transmitter and a data decoding signal processing unit configured to decode data included in a received signal using part of power received for energy charging with respect to the signal received from the transmitter.

The receiver may further include an energy charging signal processing unit configured to perform signal processing for energy charging with respect to a signal corresponding to a first signal processing rate in the signal received from the transmitter.

The energy charging signal processing unit may include a rectifier configured to rectify the signal corresponding to the first signal processing rate in the received signal and a charging unit configured to use the remaining signal except for a signal corresponding to a second signal processing rate in the rectified signal for energy recharging.

The data decoding signal processing unit may perform signal processing for data decoding with respect to the remaining signal except for a signal corresponding to a first signal processing rate in the received signal and a signal corresponding to a second signal processing rate in a signal where signal processing for energy charging is performed.

The data decoding signal processing unit may include a down-converter configured to down-convert the remaining signal except for a signal corresponding to a first signal processing rate in the received signal into a baseband signal, an analog-to-digital converter (ADC) configured to convert the down-converted baseband signal into a digital signal, and a data decoder configured to decode the data using the converted digital signal and a signal corresponding to a second signal processing rate.

The data decoding signal processing unit may decode the data based on amplitude information of a signal corresponding to a second signal processing rate and amplitude information and phase information of the remaining signal except for a signal corresponding to a first signal processing rate.

Each of the first signal processing rate and the second signal processing rate may be determined based on an amount of recharged energy for being charged with energy using the received signal.

The transceiver may share information, comprising a first signal processing rate indicating a power rate to be used for energy charging of a charging unit of the receiver and a second signal processing rate indicating a power rate to be used for the data decoding in the power rate for the energy charging, with the transmitter.

The data decoding signal processing unit may decode the data by performing differential detection for the remaining signal except for a signal corresponding to a first signal processing rate in the received signal.

The signal may be received by performing phase modulation for the remaining signal except for a signal corresponding to a first signal processing rate in the received signal and performing pulse amplitude modulation for the signal corresponding to the first signal processing rate.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
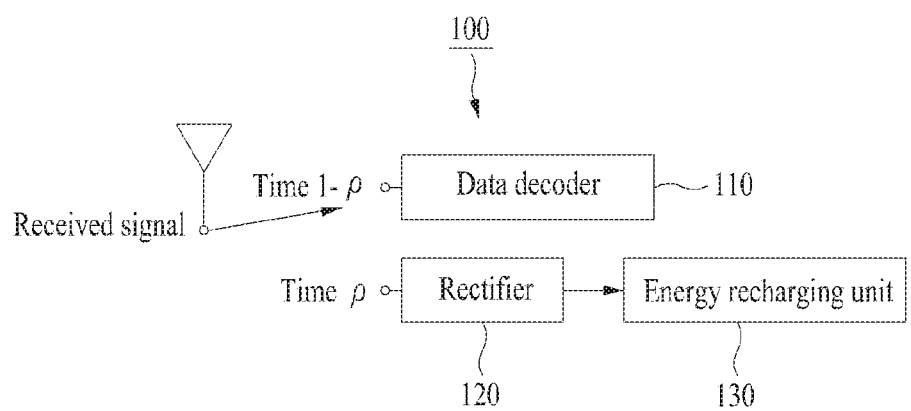
FIG. 1 is a block diagram illustrating a configuration of a receiver for simultaneously performing energy recharging and data decoding using time division.
Figure 2:
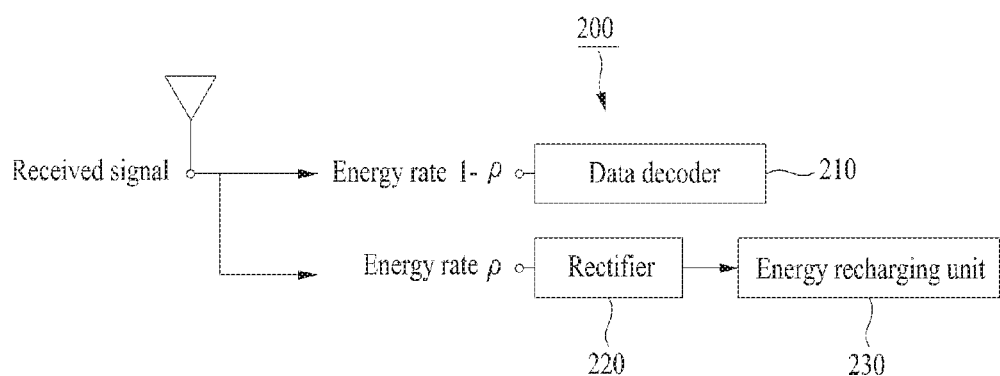
FIG. 2 is a block diagram illustrating a configuration of a receiver for simultaneously performing energy recharging and data decoding using power split.
Figure 3:
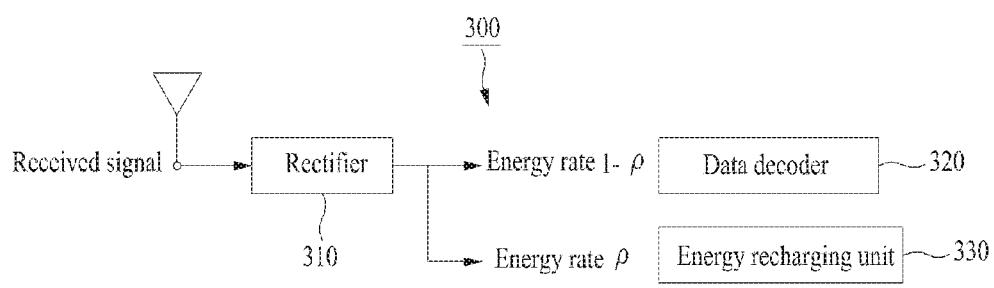
FIG. 3 is a block diagram illustrating a configuration of a receiver for performing energy recharging and data decoding using the whole radio frequency (RF) signal received from a transmitter.

Hereinafter, an embodiment will be described in detail with reference to the accompanying drawings.

An embodiment relates to technologies of simultaneously performing signal processing for energy recharging and signal processing for data decoding at a receiver. Particularly, an embodiment relates to RF-based wireless energy charging and relates to technologies of using part of a signal passing through a rectifier for signal processing for energy recharging together with a signal which does not pass through the rectifier for data decoding. In other words, an embodiment relates to technologies of using charging state information indicating how much energy charges a battery of a receiver for data coding.

An embodiment relates to technologies of checking a level at which energy charges a battery by using charging state information as amplitude information and transmitting and receiving data with a transmitter while obtaining charging efficiency at which the same energy may be charged at a longer distance than a power split scheme upon energy transfer with the same power.

A receiver for simultaneous energy and data transfer proposed in an embodiment and a signal processing method thereof may be applied to a variety of mobile communication systems such as a long term evolution (LTE) mobile communication system, an LTE-advanced (LTE-A) mobile communication system, a high speed downlink packet access (HSDPA) mobile communication system, a high speed uplink packet access (HSUPA) mobile communication system, a $3^{rd}$ generation project partnership 2 (3GPP2) high rate packet data (HRPD) mobile communication system, a 3GPP2 wideband code division multiple access (WCDMA) mobile communication system, a 3GPP2 CDMA mobile communication system, and an institute of electrical and electronics engineers (IEEE) mobile communication system.

In embodiments, signal processing for energy recharging and signal processing for data decoding may be performed with respect to a signal received from a transmitter by a receiver. For example, the transmitter may refer to a base station (BS), and the receiver may mean user equipment (UE) which belongs to the BS. In the specification, the receiver may be represented as a signal processing device.

In embodiments, it is assumed to be a wireless communication environment where one UE belongs to one BS and where each of the BS and the UE has one antenna.

Hereinafter, a description will be given of an operation of a receiver which simultaneously performs signal processing for energy recharging and signal processing for data decoding for increasing the whole data rate by enhancing transfer efficiency of amplitude information of data (i.e., signal strength information) while supplementing a phase information loss generated as a received signal passes through a rectifier. In other words, a description will be given of an operation of feeding back part of a signal used upon signal processing for energy recharging to a data decoder in a process (a data decoding process) of decoding amplitude and phase information of a received signal to use the part of the signal as data amplitude information.

Figure 4:
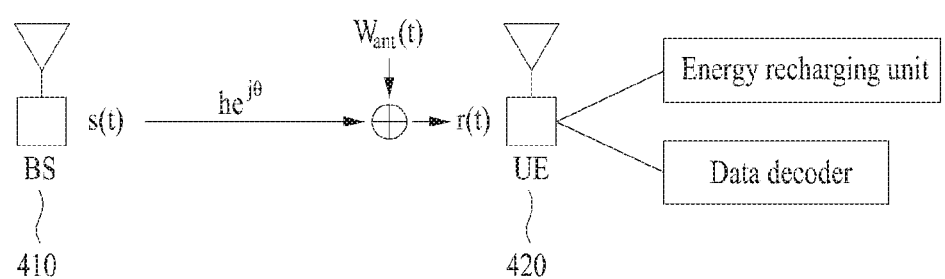
FIG. 4 is a block diagram illustrating an environment of a wireless communication system for simultaneously performing energy recharging and data decoding in an embodiment.

FIG. 4 is a block diagram illustrating an environment of a wireless communication system for simultaneously performing energy recharging and data decoding in an embodiment.

In FIG. 4, it is assumed to be a downlink mobile communication environment and it is assumed that a transmitter includes a BS and that a receiver includes a UE.

The wireless communication system in FIG. 4 may include one transmitter 410 and one receiver 420. Each of the transmitter 410 and the receiver 420 may include one antenna.

The transmitter 410 may generate a transmit signal based on a predefined signal processing rate and may transmit the generated transmit signal to the receiver 420. Herein, the signal processing rate (e.g., a signal processing rate $\rho$ or $\eta$) may be determined based on an amount of recharged energy the receiver 420 which is the UE wants, may be determined by the transmitter 410, or may be determined by the receiver 420. For example, if the signal processing rate is determined by the transmitter 410, the transmitter 410 may receive a message for requesting to recharge energy from the receiver 420. The energy recharging request message may include an amount of recharged energy the receiver 420 wants, that is, information about an amount of energy requested for recharging.

In FIG. 4, a wireless channel on a passband having a carrier frequency f between the transmitter 410 and the receiver 420 may be represented as $he^{j\theta}$. h may denote amplitude of the wireless channel (i.e., a channel coefficient), and $\theta$ may denote a phase of the wireless channel. $W_{ant}$ may denote a noise on a passband, generated in a received signal process. A transmit signal s(t) on a passband at the transmitter 410 may be represented as Equation 1 below.

$$s(t)=\sqrt{2P}x_a(t)\cos 2\pi f t+x_\phi(t)) \quad \text{[Equation 1]}$$

In Equation 1, P may denote a transmit power of a transmitter, and $x_a(t)$ may denote amplitude information (i.e., strength information) of a transmit signal. $X_\phi(t)$ may denote phase information of the transmit signal.

In this case, assuming an additive white Gaussian noise (AWGN) channel, a signal r(t) received at the receiver 420 may be represented as Equation 2 below.

$$r(t)=\sqrt{2P}hx_a(t)\cos(2\pi f t+x_\phi(t)+\theta)+w_{ant}(t) \quad \text{[Equation 2]}$$

In Equation 2, P may denote a transmit power, and $x_a(t)$ may denote amplitude information of a received signal. $X_\phi(t)$ may denote phase information of the received signal, and $\theta\in[0,2\pi)$ may denote a phase shift. h may denote a channel coefficient, and $W_{ant}$ may denote a noise on a passband, generated in a received signal process.

The receiver 420 may use a received signal of a constant rate for energy recharging based on a predefined signal processing rate shared with the transmitted with 410 and may use a received signal of the remaining rate for data decoding. In this case, the receiver 420 may use part of a signal in which signal processing for energy recharging is performed for data decoding.

Figure 5:
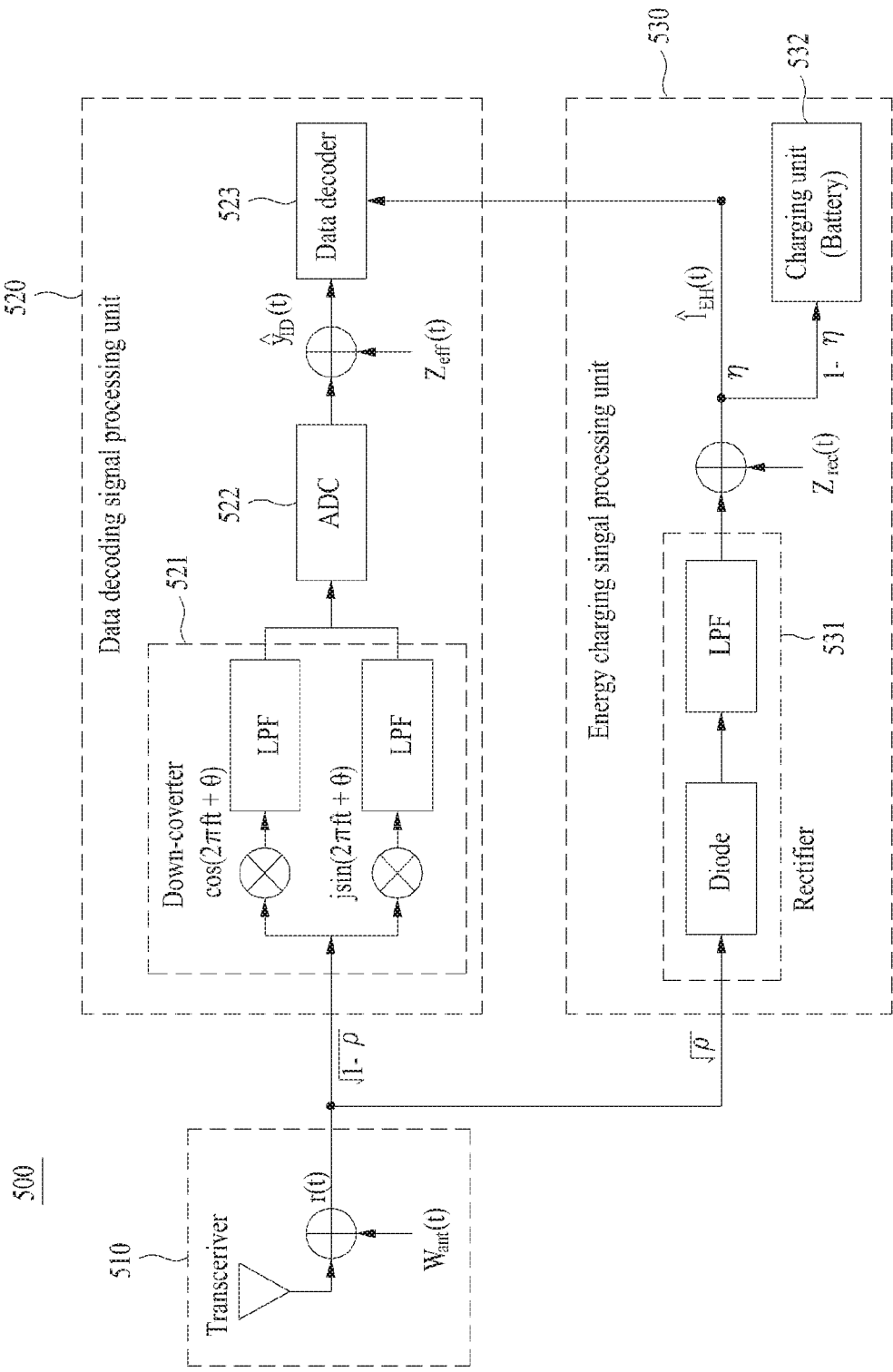
FIG. 5 is a block diagram illustrating a configuration of a receiver using a signal for energy recharging and a signal for data decoding in an integrated manner in an embodiment.

FIG. 5 is a block diagram illustrating a configuration of a receiver using a signal for energy recharging and a signal for data decoding in an integrated manner in an embodiment.

Figure 6:
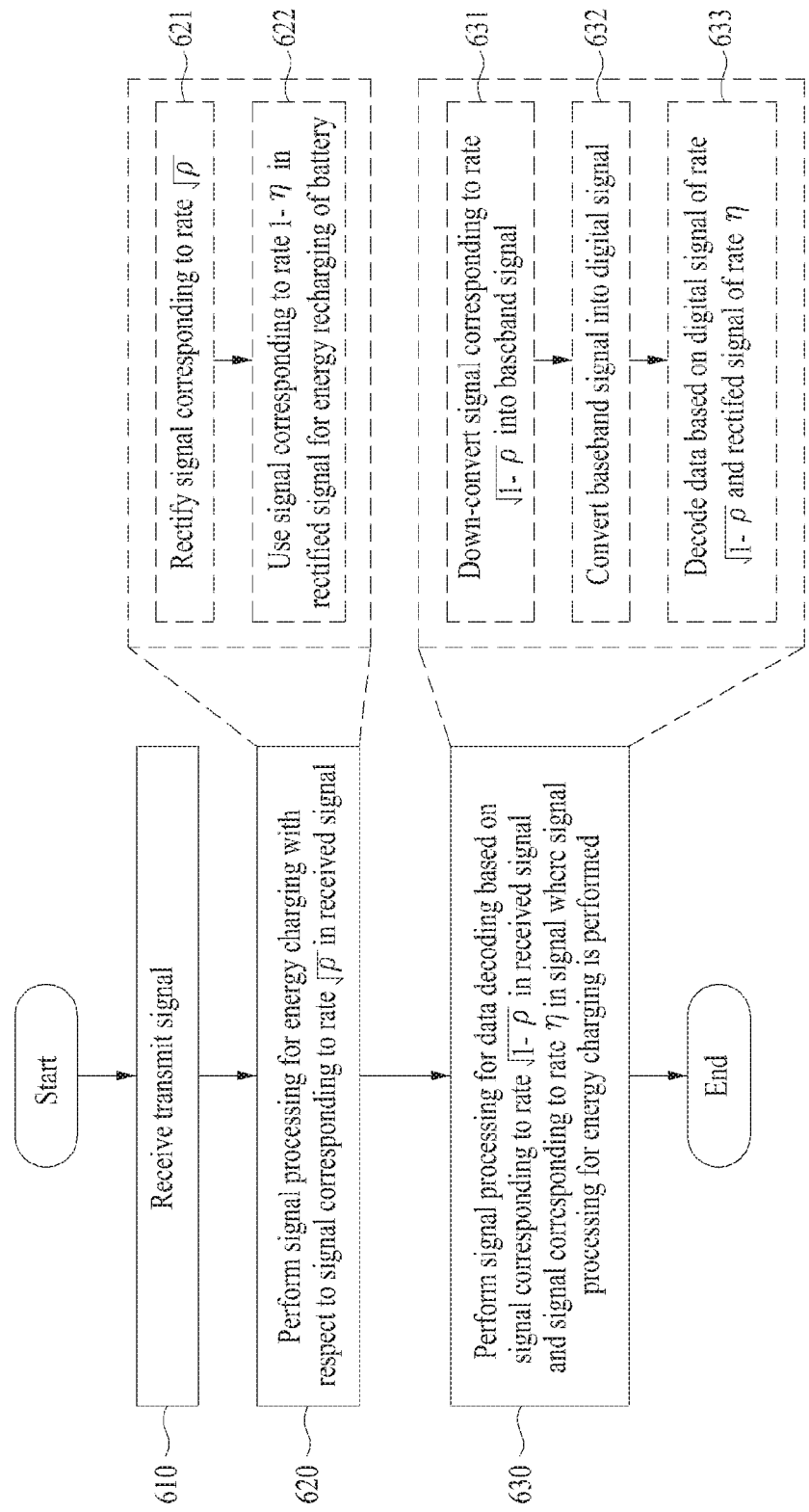
FIG. 6 is a flowchart illustrating an operation of performing signal processing using a signal for energy recharging and a signal for data decoding in an integrated manner in an embodiment.

FIG. 6 is a flowchart illustrating an operation of performing signal processing using a signal for energy recharging and a signal for data decoding in an integrated manner in an embodiment.

A description will be given of an operation of a receiver which uses a partial signal in which signal processing for energy recharging is performed for data decoding with reference to FIGS. 5 and 6.

In FIGS. 5 and 6, a first signal processing rate $\rho$ and a second signal processing rate $\eta$ may be shared in advance between a transmitter (not shown) and a receiver 500 and may be calculated by one of the transmitter or the receiver 500. An operation of calculating and sharing the first and second signal processing rates $\rho$ and $\eta$ will be described later with reference to FIG. 7.

Operations (e.g., operations 610 to 630) in FIG. 6 may be performed by a transceiver 510, a data decoding signal processing unit 520, and an energy charging signal processing unit 530 which are components of FIG. 5. The data decoding signal processing unit 520 may include a down-converter 521, an analog-to-digital converter (ADC) 522, and a data decoder 523. The energy charging signal processing unit 530 may include a rectifier 531 and a charging unit 532.

In operation 610, the transceiver 510 may receive a transmit signal for energy charging and data decoding via an antenna from the transmitter such as a BS. For example, a received signal r(t) may be represented as Equation 1 above.

In operation 620, the energy charging signal processing unit 530 may perform signal processing for energy charging with respect to a signal corresponding to a rate $\sqrt{\rho}$ based on the predefined first signal processing rate $\rho$ in the received signal r(t). The energy charging signal processing unit 530 may include the rectifier 531 configured with a diode and a low pass filter (LPF) and the charging unit 532, such as a battery, for energy charging.

First of all, in operation 621, the rectifier 531 may rectify the signal corresponding to the rate $\sqrt{\rho}$, which is part of the received signal r(t).

In other words, a signal having energy of the rate $\sqrt{\rho}$ in the received signal r(t) may pass through the diode and the LPF. As such, as the signal of the rate $\sqrt{\rho}$ passes through the diode and the LPF, the signal rectified by passing through the LPF may be converted down to a baseband signal without separately perform down-converting. Thus, part of the rectified signal of the rate $\sqrt{\rho}$ may be used for energy charging, and the rest of the rectified signal may be used for data decoding. In other words, a charging level about how much energy charges the battery may be checked, and amplitude information of part of a signal to be used for energy charging may be used for data decoding based on a charging state.

In operation 622, the charging unit 532 may use part of the rectified signal of the rate $\sqrt{\rho}$ for energy recharging based on the predefined second signal processing rate $\eta$.

For example, the charging unit 532 may use a power of a baseband signal having energy of a rate $1-\eta$ in the rectified signal of the rate $\sqrt{\rho}$ to recharge a battery of the receiver 500. In this case, an amount of energy recharged at the battery may be $Q=\zeta\eta\rho h^2 P$. Herein, $\zeta$ may refer to efficiency at which the battery is recharged.

A baseband signal $\hat{i}_{EH}(t)$ having energy of the rate η in the rectified signal of the rate $\sqrt{\rho}$ may be transmitted as an input of the data decoder 523 of the data decoding signal processing unit 520 for data decoding. The baseband signal $\hat{i}_{EH}(t)$ of the rate η in the rectified signal of the rate $\sqrt{\rho}$, input from the rectifier 531 to the data decoder 523, may be represented as Equation 3 below.

$$\hat{i}_{EH}(t) = \eta \cdot \left( \left| \sqrt{\rho h^2 P} x_a(t) e^{j(\theta + x_\phi(t))} + \sqrt{\rho} z_{ant}(t) \right|^2 + z_{rec}(t) \right) \quad \text{[Equation 3]}$$
$$= \eta \cdot \left( \left| \sqrt{\rho h^2 P} x_a(t) + \sqrt{\rho} z_{ant}(t) \right|^2 + z_{rec}(t) \right)$$

In Equation 3, P may denote a transmit power, and $x_a(t)$ may denote amplitude information of a received signal. $x_\phi(t)$ may be phase information of the received signal, and $\theta \in [0, 2\pi)$ may denote a phase shift. h may denote a channel coefficient, and $z_{rec}(t)$ may denote a noise on a baseband, generated while passing through the rectifier 531, and $z_{ant}(t)$ may denote an antenna noise. According to Equation 3, as phase information of the signal corresponding to the rate $\sqrt{\rho}$, rectified while passing through the rectifier 531, is changed and lost, it may be known that only amplitude information of the rectified signal of the rate $\sqrt{\rho}$ is transmitted to the data decoder 523 to use the rectified signal for data decoding.

In operation 630, the data decoding signal processing unit 520 may perform signal processing for data decoding based on a signal having energy of a rate $\sqrt{1-\rho}$ which is part of the received signal r(t) and a signal having energy of the rate η in a signal where signal processing for energy charging is performed. The signal having the energy of the rate $\sqrt{1-\rho}$ may have both of amplitude information and phase information because it does not pass through the rectifier 521. Thus, the data decoding signal processing unit 520 may decode data using the amplitude information and the phase information of the signal having the energy of the rate $\sqrt{1-\rho}$ and the amplitude information of the signal having the energy of the rate η. As such, the amplitude information of the rectified signal and amplitude information of an analog-to-digital converted signal may be added by allowing the data decoder 523 to use the amplitude information of part of a signal for charging the battery of the receiver 500 with energy, rather than decoding data using only the signal of the data decoding signal processing unit 520, thus minimizing data and energy losses.

First of all, in operation 631, the down-converter 521 may down-convert the signal corresponding to the rate $\sqrt{1-\rho}$, which is part of the received signal r(t), (i.e., the signal having the energy of the rate $\sqrt{1-\rho}$) into a baseband signal.

For example, the down-converter 521 may multiply the signal of the rate $\sqrt{1-\rho}$ by a cosine function $\cos(2\pi ft+\theta)$ and a sine function $j \sin(2\pi ft+\theta)$. The signal multiplied by the cosine function and the signal multiplied by the sine function may pass through LPFs, respectively. The down-converter 521 may convert the signal of the rate $\sqrt{1-\rho}$ into the baseband signal by adding two signals which pass through the LPFs.

In operation 632, the ADC 522 may convert the baseband signal having the energy of the rate $\sqrt{1-\rho}$ into a digital signal.

In other words, the analog signal of the rate $\sqrt{1-\rho}$ may be converted into the digital signal. The digital signal $\hat{y}_{ID}(t)$ of the rate $\sqrt{1-\rho}$ may be transmitted as an input of the data decoder 523 for data decoding. In this case, a noise $z_{eff}(t)$ may be generated in a process of converting the signal of the rate $\sqrt{1-\rho}$, which does not pass through the rectifier 531, into the baseband signal and converting the baseband signal into the digital signal $\hat{y}_{ID}(t)$. The nose $z_{eff}(t)$ may refer to a noise on all basebands upon down-converting and analog-to-digital converting.

In operation 633, the data decoder 523 may decode data based on the baseband signal $\hat{i}_{EH}(t)$ of the rate η input from the rectifier 531 and the digital signal $\hat{y}_{ID}(t)$ of the rate $\sqrt{1-\rho}$ input from the ADC 523.

The data decoder 523 may decode both of amplitude information and phase information of the received signal r(t) by combining the amplitude information of the baseband signal $\hat{i}_{EH}(t)$ of the rate η with the amplitude information and the phase information of the digital signal $\hat{y}_{ID}(t)$ of the rate $\sqrt{1-\rho}$. In other words, the data decoder 523 may decode the data. For example, amplitude information may be increased by combining, for example, adding the amplitude information of the baseband signal $\hat{i}_{EH}(t)$ of the rate η to the amplitude information of the digital signal $\hat{y}_{ID}(t)$ of the rate $\sqrt{1-\rho}$ or multiplying the amplitude information of the digital signal $\hat{y}_{ID}(t)$ of the rate $\sqrt{1-\rho}$ by the amplitude information of the baseband signal $\hat{i}_{EH}(t)$ of the rate η. As such, as the amplitude information of the baseband signal $\hat{i}_{EH}(t)$ of the rate η, which is part of a signal for energy charging, is used upon data decoding, data decoding may be performed using only power supplied from the transmitter for energy charging without the necessity of separately receiving power for data decoding. In other words, the receiver 500 may simultaneously perform energy charging and data communication in a form where a charging protocol and a communication protocol such as Bluetooth are combined. Thus, when communication is performed using Bluetooth, a separate power should be received for data decoding. However, the receiver 500 according to an embodiment may decode data without receiving a separate power by using part of energy which charges the battery for data decoding.

In this case, as described with reference to FIGS. 5 and 6, the data decoder 523 may decode data using coherent detection or may decode data using non-coherent detection other than coherent detection. For example, if it is permitted to increase complexity of a transmitter and a receiver in an environment of a wireless communication system, coherent detection such as M-ary phase shift keying (MPSK) may be used to obtain a high rate. Although a power loss of about 3 dB versus the same performance is endured, if the complexity of the transmitter and the receiver wants to be reduced, non-coherent detection such as audio frequency shift keying (AFSK) may be used. In addition, the data decoder 523 may decode data using differential detection. If using the differential detection, a signal of a rate $\sqrt{1-\rho}$ detected through the differential detection may be used for data decoding without down-converting.

As such, the data decoding signal processing unit 520 may reduce or minimize energy required for a process of decoding data and may more increase data decoding performance for a signal in which a noise exists than if the amplitude information of the baseband signal $\hat{i}_{EH}(t)$ having the energy of the rate η is not used, by using the amplitude information of the baseband signal $\hat{i}_{EH}(t)$ having the energy of the rate q, obtained in the energy charging signal processing, in the process of decoding data as well as the amplitude information and the phase information of the signal having the energy of the rate $\sqrt{1-\rho}$. The signal having the energy of the rate $\sqrt{1-\rho}$ may have both the amplitude information and the phase information since it does not pass through the rectifier 531, thus more increasing a data rate than if the whole received signal passes through the rectifier 531.

Figure 7:
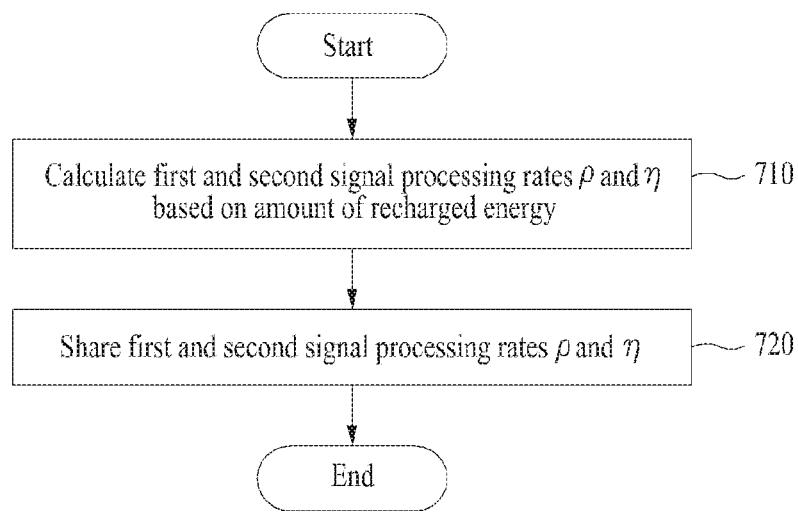
FIG. 7 is a flowchart illustrating an operation of sharing first and second signal processing rates in an embodiment.

FIG. 7 is a flowchart illustrating an operation of sharing first and second signal processing rates in an embodiment.

In FIG. 7, an embodiment is exemplified as a receiver 500 of FIG. 5 calculates a first signal processing rate $\rho$ and a second signal processing rate $\eta$. Embodiments are not limited thereto. For example, the receiver 500 of FIG. 5 may further include a signal processing rate calculator (not shown) for calculating and sharing first and second signal processing rates. In this case, the first and second signal processing rates may be calculated by a transmitter such as a BS other than a receiver such as a UE.

In operation 710, the receiver 500 may determine the first signal processing rate $\rho$ and the second signal processing rate $\eta$ based on an amount of recharged energy the receiver 500 wants or needs.

In operation 720, the receiver 500 may transmit the calculated first signal processing rate $\rho$ and the calculated second signal processing rate $\eta$ to a transmitter which is a BS. In this case, the receiver 500 and the transmitter may be connected via a device such as a backhaul. The first and second signal processing rates $\rho$ and $\eta$ may be transmitted to the transmitter via the backhaul and may be shared between the transmitter and the receiver 500. Herein, the first signal processing rate $\rho$ may denote a rate of a signal to be used for signal processing for energy charging in a received signal, and the second signal processing rate $\eta$ may indicate a rate of a signal to be used again for data decoding in a rectified baseband signal. In other word, the second signal processing rate $\eta$ may represent a rate of a partial signal to be used for data decoding in a signal for charging a charging unit 532 of FIG. 5 which is a battery of the receiver 500 with energy.

In FIG. 7, if the first and second signal processing rates $\rho$ and $\eta$ are calculated by the transmitter such as the BS, the transmitter may receive a message for requesting an amount of recharged energy from the receiver 500 and may transmit the first and second signal processing rates $\rho$ and $\eta$ calculated based on the amount of recharged energy to the receiver 500 via the backhaul, thus sharing the first and second signal processing rates $\rho$ and $\eta$ with the receiver 500.

As such, after the first and second signal processing rates $\rho$ and $\eta$ are shared between the transmitter and the receiver 500, the transmitter may transmit a transmit signal to the receiver 500. The receiver 500 may simultaneously perform signal processing for energy charging and signal processing for data decoding with respect to a signal received from the transmitter based on the first and second signal processing rates $\rho$ and $\eta$.

As described above with reference to FIGS. 4 to 7, the receiver 500 according to an embodiment may receive a signal including a signal and data for energy charging together from the transmitter and may perform data decoding using only power supplied from the transmitter for energy charging without receiving a separate power using amplitude information of part of the signal for the energy charging. In this case, since the receiver 500 uses only the amplitude information of the signal for the energy charging, there is a need for efficiently modulating the signal and data for the energy charging and transmitting the modulated signal and data to the receiver 500. For example, pulse amplitude modulation (PAM) may be performed for a signal of a rate $\sqrt{\rho}$, and phase modulation may be performed for a signal of a rate $\sqrt{1-\rho}$ for energy charging, thus transmitting the signal from the transmitter to the receiver 500.

Hereinafter, a description will be given of an operation of modulating a signal transmitted from a transmitter to a receiver to classify the number of signal points while charging a battery with energy. Herein, a variety of coherent and non-coherent modulation schemes such as PAM, FSK, and binary phase shift keying (BPSK) may be used. An amplitude level of a signal, a frequency interval, whether to use some frequency information, and the like may be optimized.

Figure 8:
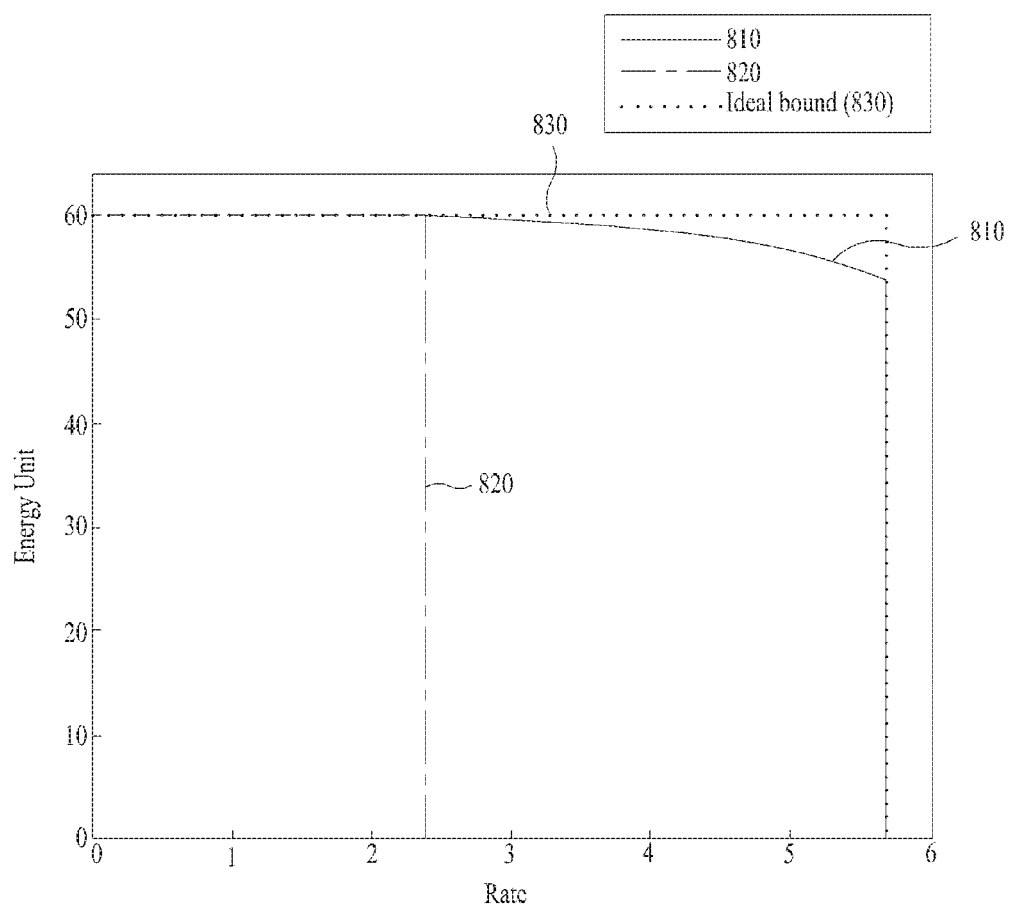
FIGS. 8 and 9 are drawings illustrating a relationship between an achievable amount of transferred energy and an achievable data rate in an embodiment.
Figure 9:
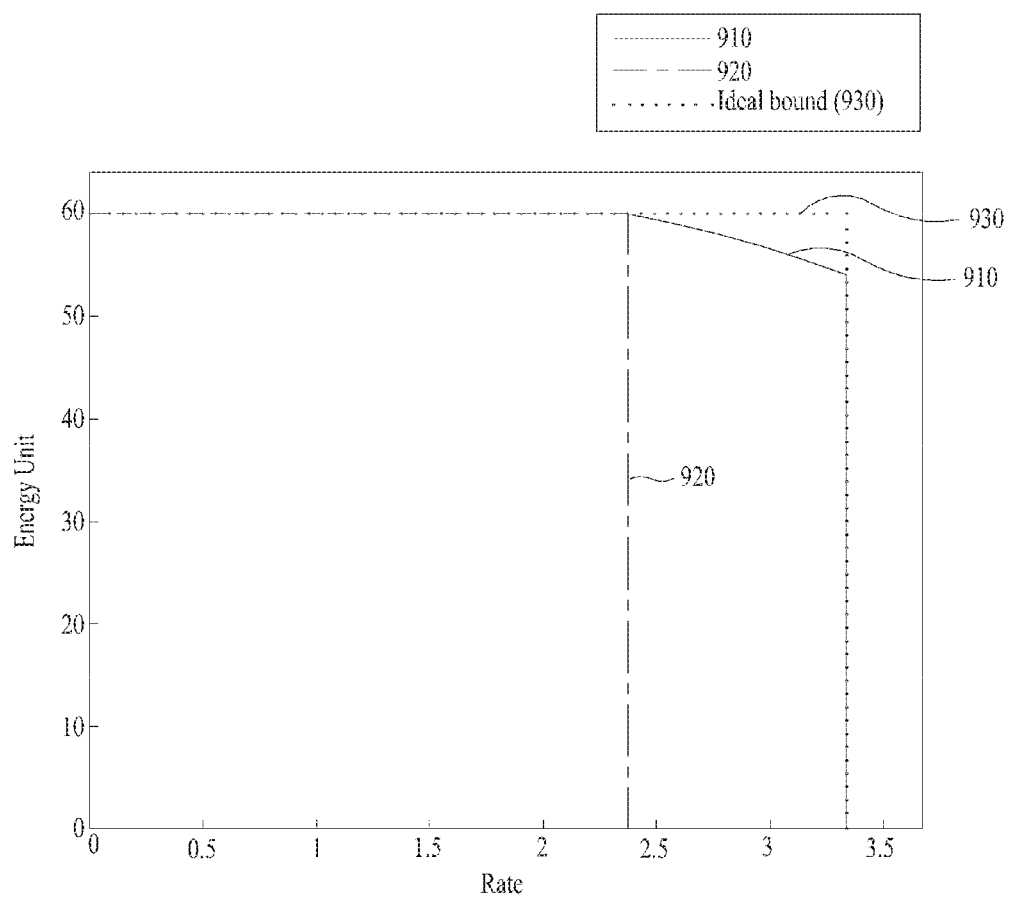

FIGS. 8 and 9 are drawings illustrating a relationship between an achievable amount of transferred energy and an achievable data rate in an embodiment.

In FIG. 8, it is assumed to be a wireless communication environment where strength of noises on all basebands is 1 ($z_{rec}(t)=z_{ant}(t)=z_{eff}(t)=1$), where a transmit power is 100, where $\zeta$ is 0.6, and where $\eta \approx 1$. In FIG. 8, a horizontal axis may indicate an achievable data rate (Rate), and a vertical axis may indicate an achievable maximum amount of transferred energy (Energy Unit).

In FIG. 8, an ideal bound 830 may be ideal performance which is not practically achievable and may represent a maximum amount of transferred energy which may be obtained if the whole received signal r(t) is used for recharging a battery of a receiver 500 of FIG. 5 and a maximum data rate which may be obtained if the whole received signal r(t) is used for data decoding. Referring to FIG. 8, if a transmit signal follows Gaussian distribution, it may be verified that performance 810 according to signal processing at the receiver 500 proposed in an embodiment has a higher rate in simultaneous energy and data transfer than performance 820 if a signal of a rate $\sqrt{\rho}$ in the received signal r(t) is used for signal processing for energy charging and if a signal of a rate $\sqrt{1-\rho}$ is used for signal processing for data decoding. In other words, it may be verified that the performance 820 if a signal of a rate q, which is part of the signal of the rate $\sqrt{\rho}$, is not used for data decoding and if the whole signal of the rate $\sqrt{\rho}$ is used for energy recharging is sharply reduced at a point 2.3 in data rate, whereas the performance 810 if the signal of the rate $\eta$, which is part of the signal of the rate $\sqrt{\rho}$, is used for data decoding has a higher data rate than the performance 820 while maintaining a higher amount of transferred energy. In other words, it may be verified that the performance 810 is close to ideal performance 830.

In FIG. 9, it is assumed to be a wireless communication environment where a noise $z_{eff}(t)$ on all basebands, generated in a process of converting a received signal which does not pass through a rectifier into a baseband signal and converting the baseband signal into a digital signal, are 10, where a transmit power is 100, where $\zeta$ is 0.6, and where $n \approx 1$. Similar to FIG. 8, in FIG. 9, a horizontal axis may indicate an achievable data rate (Rate), and a vertical axis may indicate an achievable maximum amount of transferred energy (Energy Unit).

In FIG. 9, if strength of the noise $z_{eff}(t)$ is increased to 10, it may be verified that a data rate which may be obtained from a received signal which does not pass through the rectifier is reduced due to the influence of the increased interference as compared with FIG. 8. Although the data rate is reduced due to the influence of the noise $z_{eff}(t)$, it may verified that performance 920 if a signal of a rate $\eta$ is used for data decoding is still close to ideal performance 930 and is better than performance 910 if the signal of the rate $\eta$ is not used for data decoding.

As described above, the receiver according to an embodiment may perform signal processing for data decoding using coherent detection, non-coherent detection, or differential detection. In this case, for the receiver to perform the above-mentioned detection, the transmitter should generate a transmit signal based on the corresponding detection. Hereinafter, a description will be given of an operation of generating a transmit signal at the transmitter if using the coherent detection. For example, the transmit signal may be generated using multi-dimensional maximum likelihood detection, combined Euclidean distance based detection, two-stage successive detection, or the like.

First of all, assuming that an amount of information to be transmitted to a UE is $\log_2 M$ bits, $\log_2 N_a$ bits among the amount of information may correspond to amplitude information of data. In other words, the amplitude information of the data may be represented as $N_a$ signal points, and the rest of the amount of information may be represented as phase information.

For example, if it is not helped by a rectified signal, the maximum likelihood detection may be used in two dimensions configured with amplitude information and phase signal of a received signal. However, if it is helped by the rectified signal, amplitude information of energy to be recharged may be used in an additional dimension. Thus, a transmit signal may be configured using the maximum likelihood detection based on three dimensions configured with the amplitude information and the phase information of the received signal and the amplitude information of energy to be recharged. For example, a signal in case of using the maximum likelihood detection may be represented as Equation 4 below.

$$y = Hs_m + n = u_m + n \quad \text{[Equation 4]}$$

In Equation 4, a channel H, a transmit signal vector $S_m$, and an additional noise vector n may be represented as $H = \text{diag}\{\sqrt{P(1-\rho)}|h|, \sqrt{P(1-\rho)}|h|, c_2 P\rho|h|^2\}$, $s_m = [\Re\{s_m\}, \Im\{s_m\}, |s_m|^2]^T$, and $n = [n_1, n_2, n_3]$, respectively. The noise vector n may indicate that $n_1 = \sqrt{1-\rho}\Re\{z_{ant}\} + \Re\{z_{eff}\}$, $n_2 = \sqrt{1-\rho}\Im\{z_{ant}\} + \Im\{z_{eff}\}$, and $z_3 = \alpha_1\Re\{z_{ant}\} + \alpha_2\Im\{z_{ant}\} + z_{rec}$. Since noises $n_1$ to $n_3$ in the noise vector n are independent of each other, it may be necessary to whiten the noises $n_1$ to $n_3$. In this case, assuming that a covariance matrix of the noise vector n is represented as Equation 5 below, criteria of maximum likelihood detection based on a received signal passing through the whitening of the noises $n_1$ to $n_3$ may be represented as Equation 6 below.

In this case, a pairwise error probability may be represented as Equation 7 below.

$$Pr(s_i \to s_j | H) = Pr(\|A_n^{-1}(y-u_i)\|^2 > \|A_n^{-1}(y-u_j)\|^2 | H) \quad \text{[Equation 7]}$$

$$= Q\left(\frac{1}{2}\|A_n^{-1}(u_i - u_j)\|\right)$$

Like Equation 7, if a pairwise error probability to meet information decoding is given in advance, a constellation for the maximum likelihood detection may be optimized. Herein, an optimization problem for optimizing the constellation may be represented as Equation 8 below.

$$(P1): \max_{N_a, \{M_k\}} \log_2 M \quad \text{[Equation 8]}$$

such that $$Q\left(\frac{1}{2}\|A_n^{-1}(u_i - u_j)\|\right) \leq P_e^{(target)}$$

$$M = \sum_{k=1}^{N_a} M_k,$$

$$\frac{1}{M}\sum_{k=1}^{N_a} M_k(2kd)^2 \leq P$$

Since the maximum likelihood detection is a scheme which makes the best performance if a receive end (i.e., a receiver) obtains and have channel information in advance, if the maximum likelihood detection is used based on an optimized constellation, the maximum likelihood detection may meet the given pairwise error probability and may simultaneously indicate the lowest data information decoding failure probability compared with other detection schemes versus the same amount of recharged energy.

As another example, if the combined Euclidean distance based detection is used, a code may be detected by performing linear superposition of a Euclidean distance in a constellation based on amplitude information and phase information obtained through an information decoding process and a Euclidean distance in a new constellation based on additional amplitude information which may be obtained from a rectified signal. If a constellation is represented with 8-ary quadrature-amplitude modulation (QAM) ($N_a = 2$) having amplitude information of two levels among examples of circular QAM, it may be shown in FIG. 10.

[Equation 5]

$$\sum_n = A_n A_n^T$$

$$= \begin{bmatrix} \{(1-\rho)\sigma_{ant}^2 + \sigma_{eff}^2\}/2 & 0 & \alpha_1\sqrt{1-\rho}\,\sigma_{ant}^2/2 \\ 0 & \{(1-\rho)\sigma_{ant}^2 + \sigma_{eff}^2\}/2 & \alpha_2\sqrt{1-\rho}\,\sigma_{ant}^2/2 \\ \alpha_1\sqrt{1-\rho}\,\sigma_{ant}^2/2 & \alpha_2\sqrt{1-\rho}\,\sigma_{ant}^2/2 & \{(\alpha_1^2+\alpha_2^2)\sigma_{ant}^2 + 2\sigma_{rec}^2\}/2 \end{bmatrix}$$

[Equation 6]

$$\min_{s_m \in S}\left(y - u_m \right)^T \sum_n^{-1}(y - u_m) = \min_{s_m \in S}\|A_n^{-1}(y - u_m)\|^2$$

Figure 10:
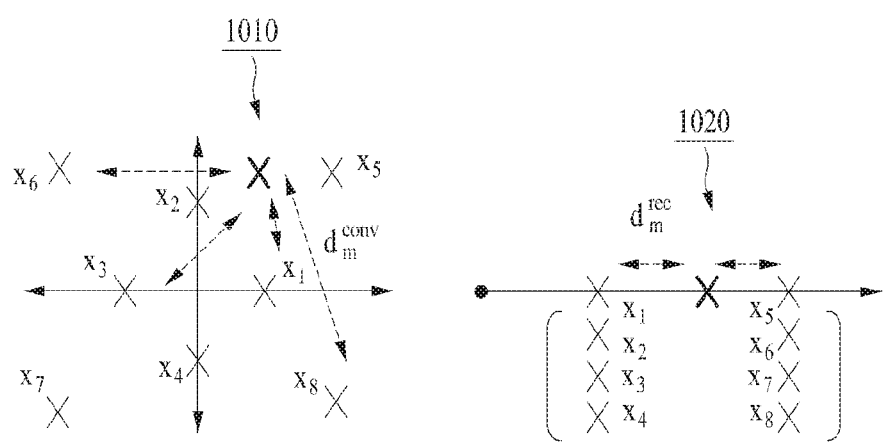
FIG. 10 is a drawing illustrating a constellation represented with 8-ary quadrature-amplitude modulation (QAM) ($N_a$=2) in an embodiment.

In FIG. 10, a constellation 1010 may indicate a constellation which may be obtained from a signal for information decoding with respect to the 8-ary QAM having two amplitude levels. A constellation 1010 may indicate a constellation which may be obtained from a rectified signal which may be additionally obtained. The constellation 1010 may indicate a process of detecting a modulation alphabet with a minimum Euclidean distance from 8 codes transmitted from a transmitter in an existing information decoding process. Since the 8 codes transmitted from the transmitter have a two-stage amplitude level, a Euclidean distance of the two-stage amplitude level may be obtained in the constellation 1020 through a rectified signal. As a result, if linear superposition of two Euclidean distances is performed, a signal such as Equation 9 below may be detected.

$$\underset{m}{\operatorname{argmin}}(1-w)d_m^{conv} + w d_m^{rec} \qquad \text{[Equation 9]}$$

In Equation 9, w may be a linear superposition rate of two Euclidean distances and may be optimized in view of minimizing a data information decoding failure probability based on information such as a transmit power already known, channel information, a power distribution ratio, a rectifier constant, and probabilistic characteristics in which strength of each of noises is reflected.

As another example, if the two-stage successive detection is used, amplitude information of data may be decoded from both of two signals $\hat{i}_{EH}(t)$ and $\hat{y}_{ID}(t)$. Thus, the number of signal points which may be decoded from the signal $\hat{i}_{EH}(t)$ among the total $N_a$ signal points may be represented as $N_{a1}$ and the number of signal points which may be decoded from the signal $\hat{y}_{ID}(t)$ may be represented as $N_{a2}$ (i.e., $N_{a2}=N_a-N_{a1}$). A constellation of a transmit signal configured based on the two-stage successive detection may be represented as FIG. 10.

Figure 11:
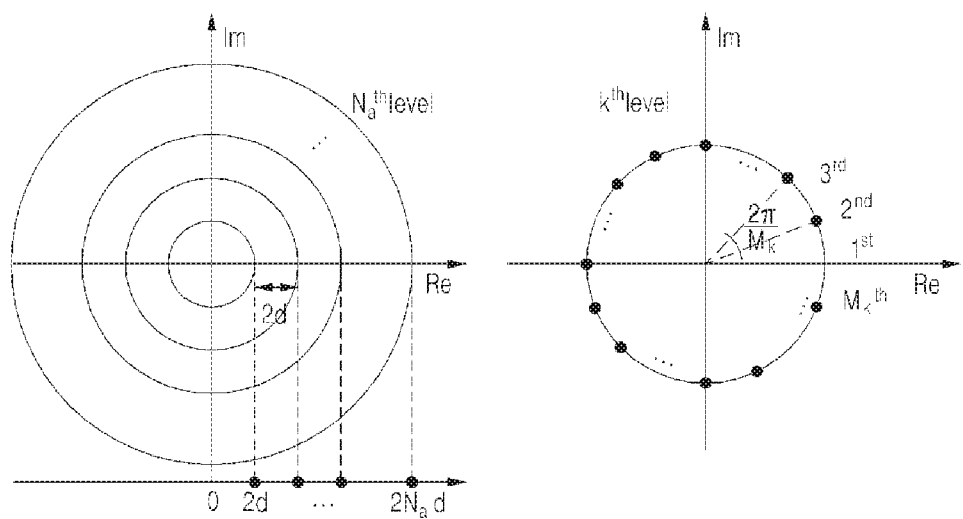
FIG. 11 is a drawing illustrating a constellation of a transmit signal according to an M-ary modulation scheme in an embodiment.

FIG. 11 is a drawing illustrating a constellation of a transmit signal according to an M-ary modulation scheme in an embodiment.

If an amount of information to be transmitted to a receiver 500 of FIG. 5 which is a UE at a transmitter which is a BS is $\log_2 M$ bits, $\log_2 N_a$ bits among the $\log_2 M$ bits may correspond to amplitude information of data. In other words, the amplitude information of the data may be represented as $N_a$ signal points. Total M signal points may be located to be classified into $N_a$ levels. In this case, each of the $N_a$ levels may indicate amplitude information of data, all of signal points in each of $N_a$ levels may have the same energy and may have a difference in only phases between each other. In FIG. 11, d may denote a distance between the $N_a$ levels.

In this case, since the amplitude information of the data is decoded using both of a rectified signal $\hat{i}_{EH}(t)$ of a rate η and a signal $\hat{y}_{ID}(t)$ of a rate $\sqrt{1-\rho}$, which does not pass through a rectifier, the number of signal points which may be decoded from the signal $\hat{i}_{EH}(t)$ among the total $N_a$ signal points is represented as $N_{a1}$ and the number of signal points which may be decoded from the signal $\hat{y}_{ID}(t)$ may be represented as $N_{a2}$ (i.e., $N_{a2}=N_a-N_{a1}$).

In decoding data, since phase information of data is not decoded from the rectified signal $\hat{i}_{EH}(t)$ of the rate η, the receiver 500 (i.e., a UE) may distinguish whether data information of a received signal is located on any level based on amplitude information of the signal $\hat{i}_{EH}(t)$. Thus, a transmitter may modulate $N_{a1}$ signal points which may be distinguished from the rectified signal $\hat{i}_{EH}(t)$ of the rate η using a modulation scheme for transmitting only amplitude information. For example, PAM may be used. In this case, a probability that the receiver 500 will fail in decoding amplitude information of data may be represented as Equation 10 below.

$$p_e, PAM \approx \frac{2(N_{a1}-1)}{N_{a1}} Q\left(\frac{2d_1}{\sqrt{2(\sigma_{ant}^2 + \sigma_{rec}^2)}}\right) \qquad \text{[Equation 10]}$$

$$= \frac{2(N_{a1}-1)}{N_{a1}} Q\left(\sqrt{\frac{3\rho P}{(\sigma_{ant}^2 + \sigma_{rec}^2)(N_{a1}+1)(2N_{a1}+1)}}\right)$$

In Equation 10, Na1 may denote the number of signal points which may be decoded from a rectified signal $\hat{i}_{EH}(t)$ of a rate η, and d1 may denote a value indicating a distance between $N_a$ signal points and may be $$2d_1 = \frac{2dN_a}{N_{a1}} = \left(\sqrt{\frac{6\rho P}{(N_{a1}+1)(2N_{a1}+1)}}\right).$$

$\sigma_{ant}^2$ may denote an antenna noise, and $\sigma_{rec}^2$ may denote a noise generated while passing through a rectifier.

As such, only whether data information included in a received signal is located on any level may be distinguished from the signal $\hat{i}_{EH}(t)$. However, the receiver 500 (i.e., the UE) may distinguish the remaining $N_{a2}$ levels from the signal $\hat{y}_{ID}(t)$ which does not pass through the rectifier and may decode phase information of the total M signal points. Thus, the transmitter (i.e., a BS) may perform modulation of having different phases of the total M signal points and locating the total M signal points on $N_a$ levels, based on a first signal processing rate ρ. In other words, the modulation may be the same as performing phase modulation of putting phase information of data on each of the total M signal points in each of the $N_a$ levels. A probability that the receiver 500 fails in decoding amplitude information of data may be represented as Equation 11 below.

$$p_e, \text{Cloud} \approx 1 - \sum_{l=1}^{N_a}\left\{\sum_{k=(l-1)\left(\frac{N_{a1}-N_a}{N_{a1}}+1\right)+1}^{l\left(\frac{N_{a1}-N_a}{N_{a1}}+1\right)} 2Q\left(\left|\frac{4kd}{\sqrt{\sigma_{ant}^2+\sigma_{eff}^2}}\right|\sin\frac{\pi}{M_k}\right)\right\} \qquad \text{[Equation 11]}$$

In Equation 11, $N_{a1}$ may denote the number of signal points which may be decoded from a rectified signal $\hat{i}_{EH}(t)$ of a rate η, and $N_a$ may denote the number of amplitude levels. $\sigma_{ant}^2$ may denote an antenna noise, and $\sigma_{eff}^2$ may denote a noise on all passbands.

As a result, a modulation scheme considering the first signal processing rate ρ may determine all of $N_a$, $N_{a1}$, and $M_k$ of meeting a condition $1-(1-p_{e,PAM})(1-p_{e,cloud}) \leq p_e^{(target)}$ with respect to a target failure probability $P_e^{(target)}$ may modulate a transmit signal based on the based on the $N_a$, $N_{a1}$, and $M_k$, and may transmit the modulated transmit signal to the receiver 500. The method of detecting this transmit signal may be implemented in view of a real circuit.

Figure 12:
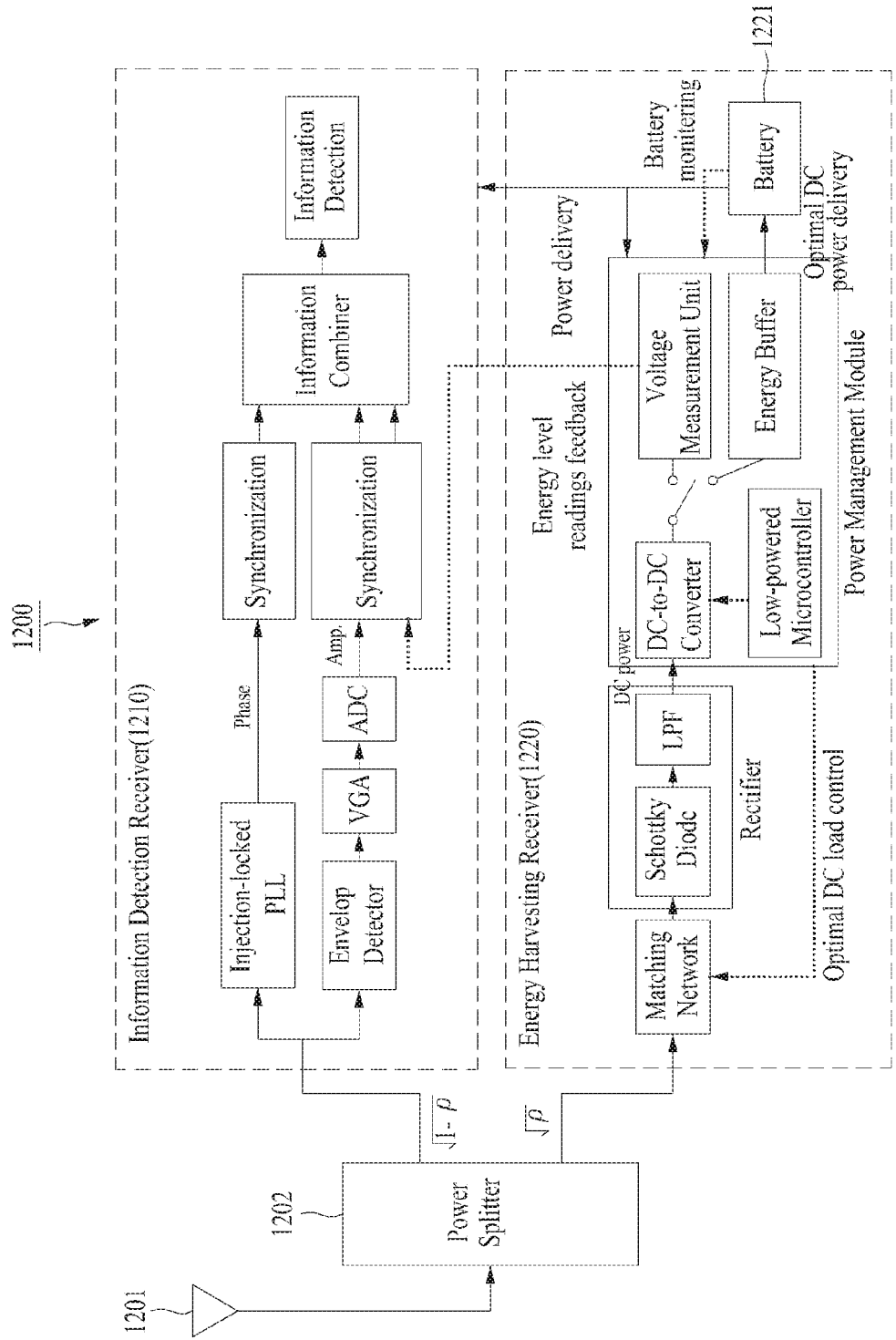
FIG. 12 is a block diagram illustrating a low-complexity circuit of a receiver for simultaneously transferring energy and data in another embodiment.

FIG. 12 is a block diagram illustrating a low-complexity circuit of a receiver for simultaneously transferring energy and data in another embodiment.

Referring to FIG. 12, a power splitter 1202 may split a signal received from an antenna 1201 into a received signal of a $\sqrt{1-\rho}$ rate input to an information detection receiver 1210 and a received signal of a $\sqrt{\rho}$ rate input to an energy harvesting receiver 1220 based on a rate according to processing the received signal.

The energy harvesting receiver 1220 may rectify the received signal of the $\sqrt{\rho}$ rate and may provide energy amplitude information to the information detection receiver 1210 based on the rectified signal concurrently with providing energy to a battery 1221. The information detection receiver 1210 may detect phase information and amplitude information based on the received signal of the $\sqrt{1-\rho}$ rate and may combine additional energy amplitude information obtained from the energy harvesting receiver 1220 with the phase information and the amplitude information, thus performing data decoding. Thus, a low-power and low-complexity circuit may be implemented based on a charged power from the battery 1221 through energy transfer without receiving power from an external power supply.

Figure 13:
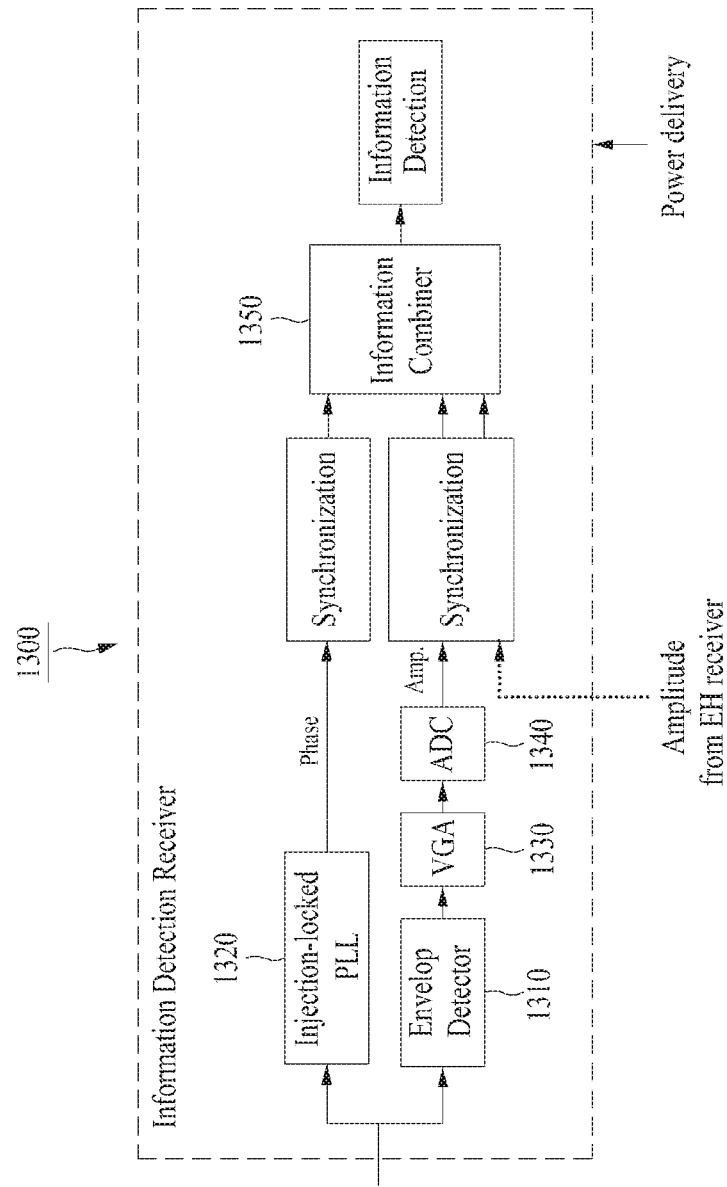
FIG. 13 is a circuit block diagram illustrating a detailed configuration of a low-power and low-complexity information detection receiver based on a charged power from a battery in an embodiment.

FIG. 13 is a circuit block diagram illustrating a detailed configuration of a low-power and low-complexity information detection receiver based on a charged power from a battery in an embodiment.

Referring to FIG. 13, an information detection receiver 1300 may detect information of a received signal and may perform more accurate detection than an existing information detection receiver using additional energy amplitude information which may be obtained from an energy harvesting receiver 1220 of FIG. 12. Since the information detection receiver 1300 should receive power from a battery 1221 of the energy harvesting receiver 1220, it should be designed to be driven with a low power. Since power received from antenna is low in general, sensitivity by an external noise may be increased. Thus, it may be important for the information detection receiver 1300 to be designed to minimize the sensitivity from the external noise. Therefore, the information detection receiver 1300 may be configured with two paths of an envelope detector 1310 and a phase-locked loop (PLL) 1320 for detecting phase information to meet conditions of a low power and sensitivity and detect amplitude information of a received signal. Since the envelop detector 1310 and the PLL 1320 facilitate being implemented with low complexity, they may be used to detect amplitude information and phase information. In addition, the information detection receiver 1300 may be implemented by further including other methods for detecting amplitude and phase information.

Amplitude information of a data signal may be detected by decoding a waveform of a signal received via the envelop detector 1310. For example, a differential envelope detector for minimizing unnecessary current consumption to facilitate a low-power configuration and have high detection accuracy may be used as the envelop detector 1310. A signal passing through the envelop detector 1310 may be input to a variable gain amplifier (VGA) 1330. The VGA 1330 may adjust a gain of the input signal and may output the adjusted signal. Accurate amplitude information may be detected through this gain adjustment irrespective of a change of power received from an antenna. A voltage signal passing through the VGA 1330 may be input to an analog-to-digital converter (ADC) 1340. The ADC 1340 may convert the input signal into a digital signal and may output the digitalized amplitude information.

The PLL 1320 may detect phase information of a data signal by detecting a phase of a received signal. For example, an injection-locked PLL which may be driven with low power and may reduce sensitivity by an external noise when detecting a phase may be used as the PLL 1320.

The information combiner 1350 may combine phase information detected via the PLL 1320, amplitude information detected via the envelop detector 1310, and additional energy amplitude information received from the energy harvesting receiver 1320. The information combiner 1350 may detect a data signal modulated by a transmitter. In other words, synchronization of each of the phase information passing through the PLL 1320, the amplitude information passing through the envelop detector 1310, and the additional energy amplitude information may be performed before the phase information, the amplitude information, and the additional energy amplitude information pass through the information combiner 1350. The synchronized information may be input to the information combiner 1350. The amplitude information, the phase information, and the additional energy amplitude information may be synchronized through this synchronization by performing delay calibration of a phenomenon desynchronized by external noises generated while passing through the information combiner 1350 and the energy harvesting receiver 1220. In this case, a structure of a used energy harvesting receiver may be like FIG. 14.

Figure 14:
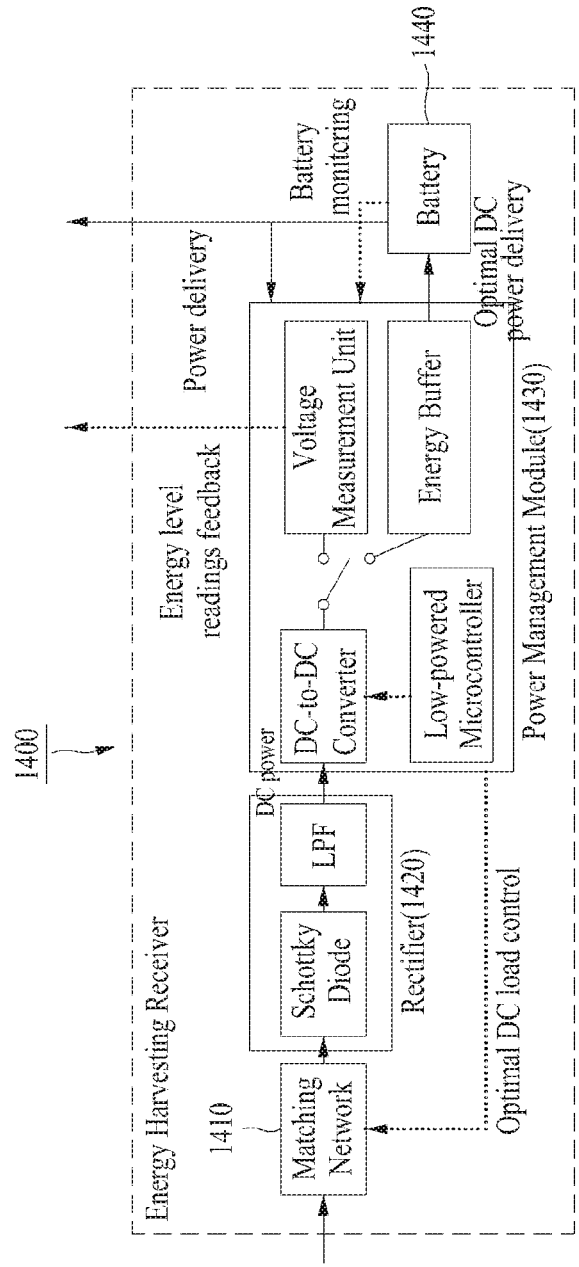
FIG. 14 is a circuit block diagram illustrating a detailed configuration of an energy harvesting receiver in an embodiment.

Referring to FIG. 14, an energy harvesting receiver 1400 may convert a signal received with a very low power from an antenna into energy. To achieve optimal conversion efficiency for the conversion into the energy may correspond to the most important element. To achieve the optimal energy conversion efficiency irrespective of power strength of a received signal, the energy harvesting receiver 1400 may include a matching network 1410, a rectifier 1420, and a power management module (PMU) 1430. Conversion efficiency may be associated with the entire load from an antenna to a battery 1440, an input power of the rectifier 1420, and diode loss. Impedance of the rectifier 1420 may be a function of an input power, and an output power may vary according to a load of the rectifier 1420. In contrast, efficiency of the PMU 1430 may be influenced by an output impedance of the rectifier 1420. Thus, efficiency of the rectifier 1420 and the efficiency of the PMU 1430 may be associated with each other. To match the entire impedance among a receive antenna, the energy harvesting receiver 1400, and the battery 1440 may correspond to an important element to optimize energy conversion efficiency. The matching network 1410 may be used to match the above-mentioned impedance in the energy harvesting receiver 1400. The rectifier 1420 may be used to rectify an alternating current (AC) signal into a direct current (DC) signal. Herein, the rectifier 1420 may include a diode and a low-pass filter (LPF). Since power received from an antenna is low, a Schottky diode having high conversion efficiency in a low-power input may be used because a diode has a low forward threshold voltage. An LPF may be used to remove harmonics in a rectified signal passing through the diode.

The PMU 1430 may be used to provide an optimal DC load to the matching network 1410 for impedance matching at a receiver, provide an optimal DC power to the battery 1440, and provide energy information to the information detection receiver 1300. The PMU 1430 may include a low-powered micro-controller, a DC-to-DC converter, a voltage measurement unit, and an energy buffer.

Since conversion efficiency varies according to power received from the antenna, the PMU 1430 may perform adaptive control of the matching network 1410 based on the optimal DC load to achieve optimal conversion efficiency based on an output voltage from the rectifier 1420. The low-powered microcontroller may be used to control the PMU 1430. Since power for driving the PMU 1430 is supplied by the battery 1440 charged from the energy harvesting receiver 1400 and is driven with low power, charging loss at the battery 1440 may be effectively reduced.

An output voltage from the rectifier 1420 may continuously fluctuate by power received from the antenna. Therefore, the DC-to-DC converter may be used to provide a stable voltage. For example, since an output voltage from the rectifier 1420 is low and fluctuates, a buck-boost type of a DC-to-DC converter having high efficiency with respect to a wide input voltage range and a very low input voltage. To keep an input impedance of the DC-to-DC converter constant, a mode of the converter may be set to a discontinuous conduction mode.

The energy buffer may be used to stably supply energy to the battery 1440 based on a voltage signal passing through the DC-to-DC converter. As such, as the energy buffer is used, a constant output voltage may be maintained although a load of the receiver fluctuates according to a received power, and energy may be steadily supplied when an input signal is not input. As a result, it may be prevented from discharging power from the battery 1440, and loss due to a sudden current increase may be reduced in a load of the battery 1440. An influence of an external noise which occurs in a long circuit path from the antenna to the battery 1440 may be reduced, and it may be prevented from a change in a load in a circuit between the PMU 1430 and the battery 1440 to increase accuracy of impedance matching in the matching network 1410.

The receiver 1200 of FIG. 12 may further include a voltage measurement unit which monitors energy amplitude information obtained from the energy harvesting receiver 1400 or 1220 and provides the monitored energy amplitude information to the information detection receiver 1300 or 1210. The voltage measurement unit may be implemented with very low complexity, may measure an energy level of a rectified signal passing through the DC-to-DC converter, and may provide the measured signal to the information detection receiver 1300 or 1210. The energy buffer and the voltage measurement unit, which are connected to supply energy to the battery 1440, may switch via a low-power switch. A speed of the switch in the switching process may be set to be the same as an information transfer speed at the information detection receiver 1300 or 1210. The PMU 1430 may periodically monitor an amount of power of the battery 1440. It is possible to optimally drive the PMU 1430 based on a charging state through this monitoring. When the battery 1440 is overcharged or fully discharged, the driving of the DC-to-DC converter may be determined, thus preventing a circuit between the PMU 1430 and the battery 1440 from being damaged.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

According to embodiments, the receiver may simultaneously perform energy recharging and data decoding by receiving a transmit signal transmitted from the transmitter and separately performing signal processing for wireless energy recharging and signal processing for data decoding based on a predefined rate for sharing the received signal with the transmitter.

Further, according to embodiments, the receiver may increase an amount of transferred energy and a data rate while reducing a phase information loss of data by using part of a signal used for signal processing for wireless energy recharging for performing signal processing for data decoding. Also, the receiver may reduce or minimize energy required for data decoding.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A signal processing method in a receiver for transferring energy and data together, the method comprising:
   receiving a signal from a transmitter;
   power splitting the received signal between a first part provided to a data decoding signal processing unit and a second part provided to an energy charging signal processing unit;
   signal processing, by the energy charging signal processing unit, the second part of the received signal;
   feeding back a portion of the second part of the received signal from the energy charging signal processing unit to the data decoding signal processing unit; and
   decoding data, by the data decoding signal processing unit, using both the first part of the received signal and the portion of the second part of the received signal fed back to the data decoding signal processing unit from the energy charging signal processing unit, wherein the decoding of the data is performed based on amplitude information of the portion of the second part of the signal indicating an amount of energy recharged at the energy charging signal processing unit and phase information of the first part of the signal for the data decoding.

2. The method of claim 1, wherein the signal processing by the energy charging signal processing unit comprises:
   rectifying the second part of the signal; and
   using the rectified second part of the signal except for the portion of the second part of the signal that is fed back to the data decoding processing unit for energy recharging.

3. The method of claim 1, wherein the data decoding comprises:

down-converting the first part of the received signal into a baseband signal;

converting the down-converted baseband signal into a digital signal; and decoding the data using the converted digital signal and the portion of the second part of the signal received from the energy charging signal processing unit.

4. The method of claim 1, wherein the decoding of the data is performed based on amplitude information of the portion of the second part of the received signal received by the data decoding signal processing unit from the energy charging signal processing unit and amplitude information and phase information of the first part of the received signal.

5. The method of claim 1, wherein the signal received from the transmitter indicates a signal modulated based on a power rate to be used for energy charging of a charging unit of the energy charging signal processing unit.

6. A receiver for transferring energy and data together, the receiver comprising:

a transceiver configured to receive a signal for energy charging and data decoding from a transmitter, the received signal split into a first part and a second part;

an energy charging signal processing unit that receives and processes the second part of the received signal; and a data decoding signal processing unit configured to receive the first part of the received signal and to receive a portion of the second part of the signal from the energy charging signal processing unit, the data decoding signal processing unit further configured to decode data included in the first part of the received signal and the portion of the second part of the received signal received from the energy charging signal processing unit, wherein the data decoding signal processing unit decodes the data based on amplitude information of the portion of the second part of the received signal and amplitude information and phase information of the first part of the received signal.

7. The receiver of claim 6, wherein the energy charging signal processing unit comprises:

a rectifier configured to rectify the second part of the received signal; and a charging unit configured to use the remaining portion of the second part of the received signal other than the portion of the second part provided to the data decoding signal processing unit for energy recharging.

8. The receiver of claim 6, wherein the data decoding signal processing unit comprises:

a down-converter configured to down-convert the first part of the received signal into a baseband signal;

an analog-to-digital converter (ADC) configured to convert the down-converted baseband signal into a digital signal; and a data decoder configured to decode the data using the converted digital signal and the portion of the second part of the received signal received from the energy charging signal processing unit.

9. The receiver of claim 6, wherein the transceiver shares information, comprising a first signal processing rate indicating a power rate to be used for energy charging of a charging unit of the receiver and a second signal processing rate indicating a power rate to be used for the data decoding in the power rate for the energy charging, with the transmitter.

10. The receiver of claim 6, wherein the signal is received by performing phase modulation for the portion of the second part of the received signal and performing pulse amplitude modulation for the first part of the received signal.

* * * * *